United States Patent

Lim

[11] Patent Number: 5,771,166
[45] Date of Patent: Jun. 23, 1998

[54] ASYMMETRICAL BRIDGE INVERTER CIRCUIT FOR DRIVING A SWITCHED RELUCTANCE MOTOR

[75] Inventor: Jun Young Lim, Seoul, Rep. of Korea

[73] Assignee: LG Electronics Inc., Rep. of Korea

[21] Appl. No.: 789,022

[22] Filed: Jan. 27, 1997

[30] Foreign Application Priority Data

Jan. 29, 1996 [KR] Rep. of Korea ..................... 1908/1996

[51] Int. Cl.[6] ............................................... H02M 7/5387
[52] U.S. Cl. .............................................. 363/132; 363/98
[58] Field of Search ................................ 363/17, 95, 98, 363/132

[56] References Cited

U.S. PATENT DOCUMENTS 4,535,275  8/1985  Damiano et al. ....................... 363/132
4,616,305  10/1986  Muller ...................................... 363/98

Primary Examiner—Jeffrey L. Sterrett
Attorney, Agent, or Firm—Ostrolenk, Faber,Gerb & Soffen, LLP

[57] ABSTRACT

An inverter circuit for a switched reluctance motor (SRM) includes a lower switching transistor connected to a corresponding lower negative pole of a filter condenser and switched in accordance with a control signal outputted from a control circuit, an upper switching transistor connected to a corresponding upper positive pole of the filter condenser and switched in accordance with a switching operation of the lower switching transistor, resistances for dividing the voltage of a DC link when the lower switching transistor is turned on, a condenser for controlling a gate voltage of the upper switching transistor in accordance with the voltage divided by the resistances, and a coil for operating a motor in accordance with a switching operation of the upper and lower switching transistors. The circuit operates in accordance with a switching operation of the lower switching transistor by replacing with a simplified passive component a voltage isolating device and a gate driver of a conventional circuit.

5 Claims, 6 Drawing Sheets

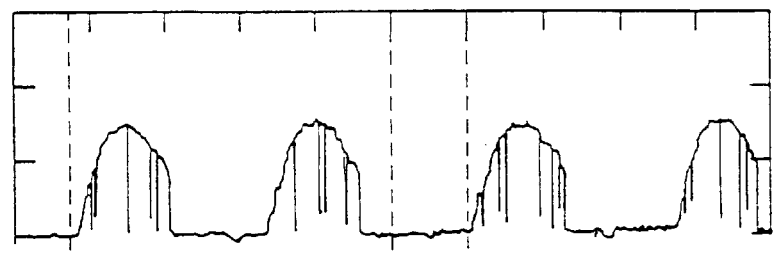
FIG.7A I(Q11)
FIG.7B Vsg(Q11)
FIG.7C Vgs(Q12)
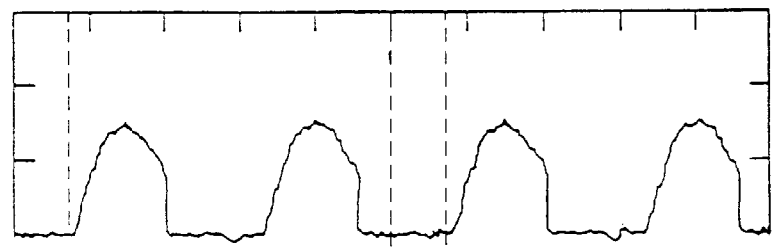
FIG.8A I(Q11)
FIG.8B Vsg(Q11)
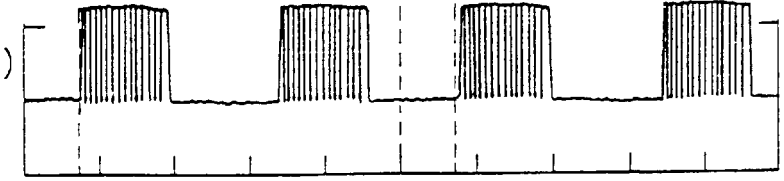
FIG.8C Vgs(Q12)

ASYMMETRICAL BRIDGE INVERTER CIRCUIT FOR DRIVING A SWITCHED RELUCTANCE MOTOR

BACKGROUND OF THE INVENTION

1. Field of the Invention

The present invention relates to an inverter circuit, and more particularly to an improved inverter circuit for a switched reluctance motor (SRM) which operates in accordance with a switching operation of a lower switch by replacing with a simplified passive component a voltage isolating device and a gate driver which are required for upper and lower switching transistors of a conventional asymmetrical bridge inverter circuit.

2. Description of the Prior Art

FIG. 1 illustrates an SRM structure having three phases A, B, C, wherein respective poles of a stator 8 and a rotor 9 are formed at a ratio of 6:4.

As shown in FIG. 2, a conventional asymmetrical bridge inverter circuit includes: upper switching transistors Q1, Q3, Q5 each connected to an upper (positive) pole of respective filter condensers C1, C2, C3; lower switching transistors Q2, Q4, Q6 connected to a lower (negative) pole of the filter condensers C1, C2, C3; gate drivers (optocouplers) 1–6 for driving the upper and lower switching transistors Q1–Q6 in accordance with commutation signals applied thereto from an external control circuit; free wheeling diodes D1, D3, D5 connected in reverse parallel with the upper switching transistors Q1, Q3, Q5; and free wheeling diodes D2, D4, D6 connected in reverse parallel with the lower switching transistors Q2, Q4, Q6 respectively. Reference numerals R1–R9 denote resistors.

The operation of the thusly constituted asymmetrical bridge inverter circuit will now be described.

First, when the rotor 9 begins rotating in accordance with operation of the SRM, a sensor (not shown) detects the position of the rotating rotor 9 relative to that of the stator 8 and outputs a position detecting signal, according to which an external control circuit (not shown) transmits the commutation signals in the form of TTL or CMOS logic level signals to the gate drivers 1–6 which then turn on the respective upper and lower switching transistors Q1, Q3, Q5 and Q2, Q4, Q6 in accordance with the commutation signals to thereby lead the phases of coils La, Lb, Lc to become active and generate a forward directional torque.

In order to control the power, pulse width modulation (PWM) is carried out, and in order to improve efficiency by decreasing a switching loss of either of the two sides, a switch of one side is switched and then the other side switch is switched to perform a commutation.

When the commutation is completed, the electric current maintained through each of the coils La, Lb, Lc is freewheeled through the diodes D1–D6 toward the DC link side.

However, the conventional asymmetrical bridge inverter circuit requires a gate driver including voltage isolation for driving each of the switches, such as an optical isolator or a pulse transformer, thereby increasing the size of a PCB and incurring a higher cost.

SUMMARY OF THE INVENTION

Therefore, it is an object of the present invention to provide an inverter circuit for a switched reluctance motor (SRM) capable of decreasing both the size of a PCB and the cost in accordance with a switching operation of a lower switch by replacing with simplified passive components an isolating voltage device and a gate driver which are required in the conventional circuit.

To achieve the above-described object, the inverter circuit for a switched reluctance motor (SRM) according to the present invention includes a lower switch connected to corresponding lower poles of respective filter condensers and switched in accordance with a control signal outputted from a commutation control circuit, an upper switch connected to corresponding upper poles of the filter condensers and switched in accordance with a switching operation of the lower switch, resistances for dividing a voltage of a DC link when the lower switch is turned on, a condenser for controlling a gate voltage of the upper switch in accordance with the voltage divided by the resistances, and a coil for operating a motor in accordance with a switching operation of the upper switching transistor and the lower switching transistor.

BRIEF DESCRIPTION OF THE DRAWINGS

FIGS. 7A–7C are voltage waveforms illustrating respective units without condensers in FIG. 3; and FIGS. 8A–8C are voltage waveforms illustrating respective units with condensers in FIG. 3.

DETAILED DESCRIPTION OF THE PRESENT INVENTION

Figure 1:
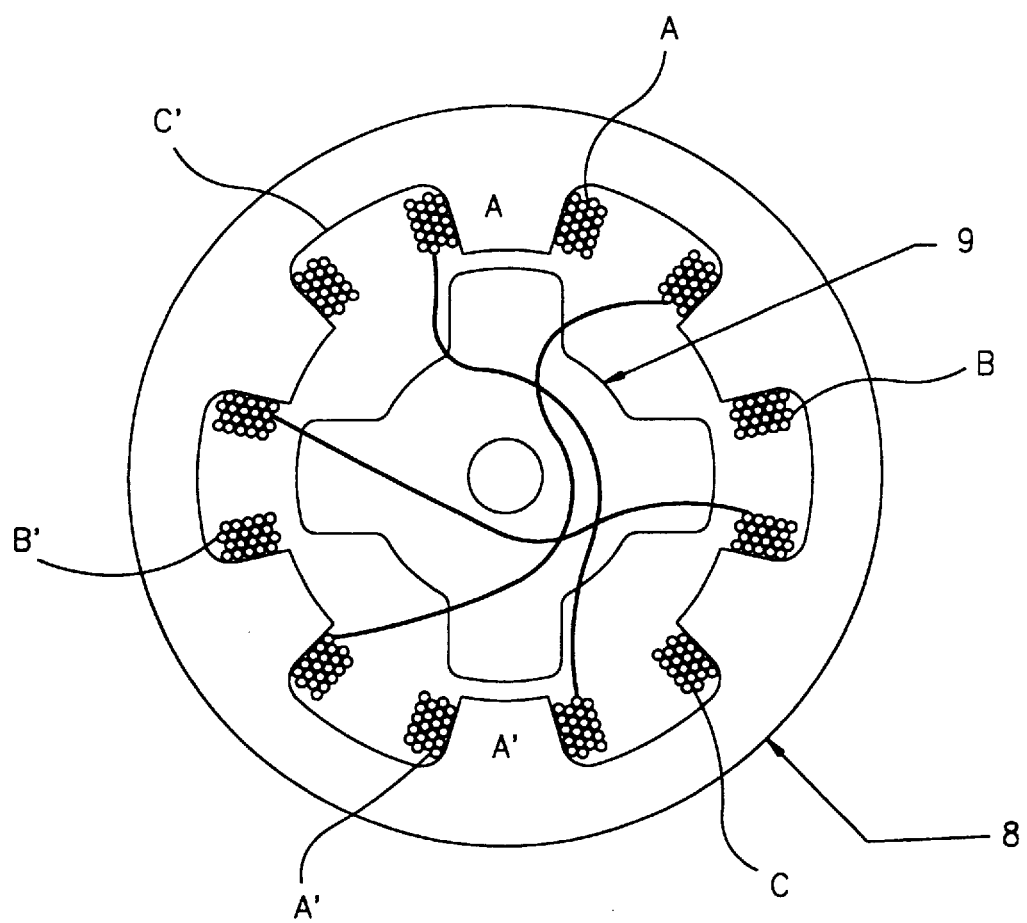
FIG. 1 is a schematic structural view of a conventional three-phase switched reluctance motor (SRM)
Figure 2:
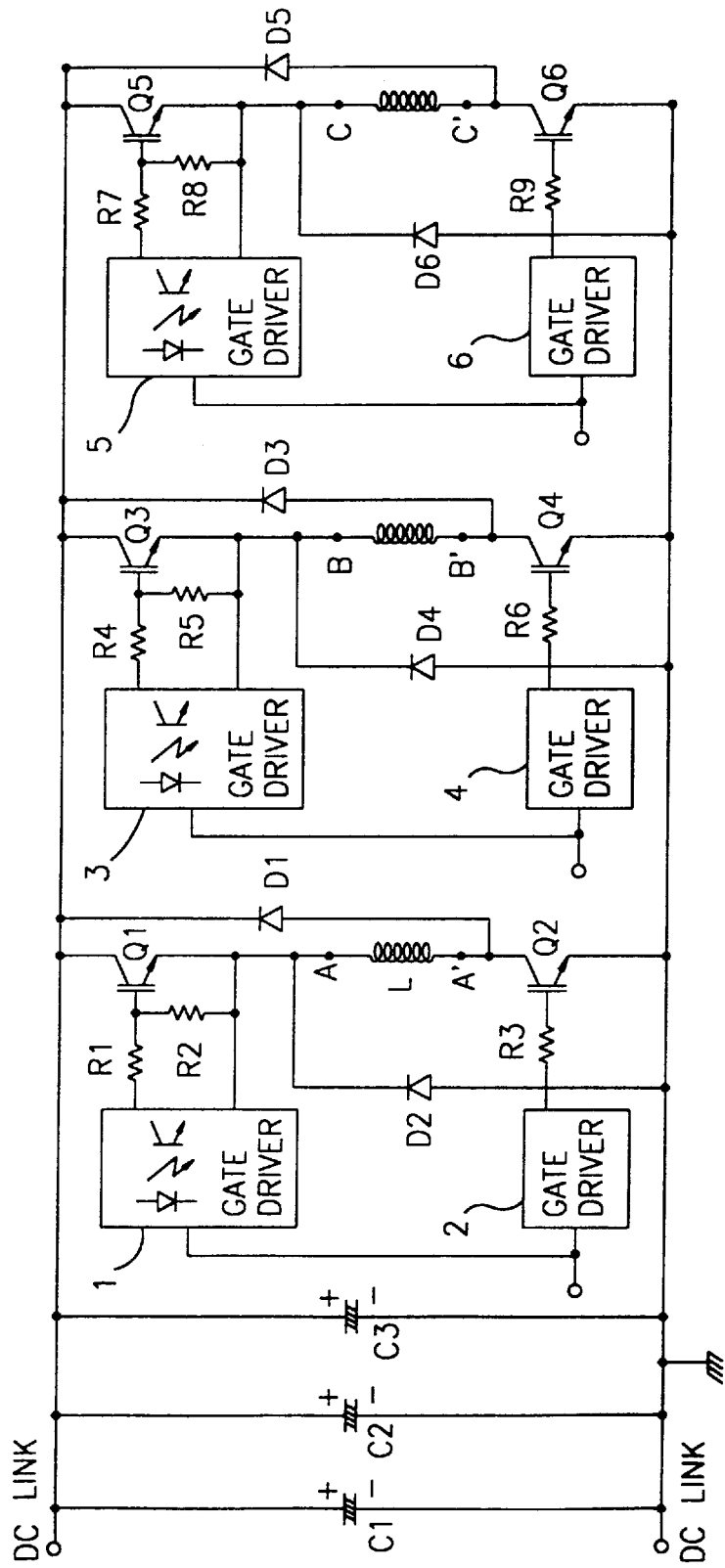
FIG. 2 is a schematic circuit diagram of a conventional asymmetric bridge inverter.
Figure 3:
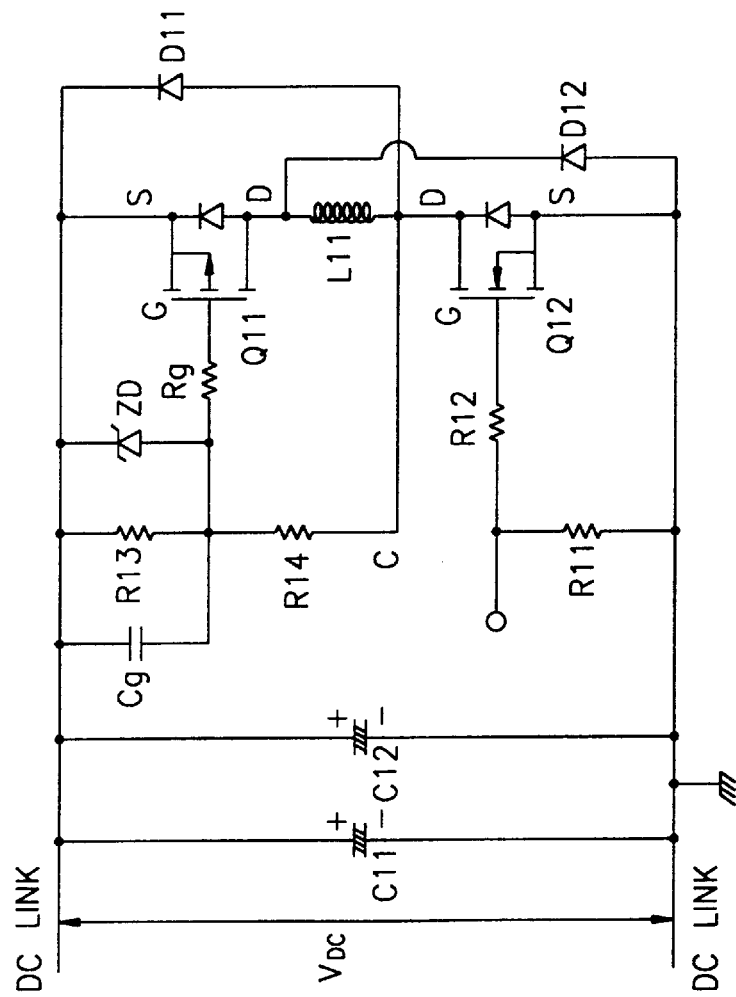
FIG. 3 is a schematic circuit diagram of a inverter circuit for an SRM according to the present invention.

As shown in FIG. 3, an inverter circuit for an SRM according to the present invention includes: resistances R11, R12 for dividing a voltage of a commutation signal received from a commutation control circuit (not shown); a lower switching transistor (NMOSFET) Q12 connected at its source to the lower (negative) poles of the filter condensers (capacitors) C11, C12 and being switched in accordance with the commutation signal divided by the resistances R11, R12 and applied to its gate; an upper switching transistor (PMOSFET) Q11 connected at its source to the upper poles of the filter condensers C11, C12; a condenser Cg for controlling a gate voltage of the upper switching transistor Q11; resistances R13, R14 for dividing the DC link voltage; a zener diode ZD for limiting a gate voltage of the upper switching transistor Q11; a coil (inductor) L11 (of the motor, not shown) for driving the motor according to the switching operation of the upper switching transistor Q11 and the lower switching transistor Q12; and free wheeling diodes D11, D12 for free wheeling the current of the coil L11. Reference numeral Rg denotes a gate series resistance.

Here, the upper switching transistor Q11 is a P-channel MOSFET transistor and the lower switching transistor Q12 is an N-channel MOSFET transistor.

The above-described circuit construction is an example of the inverter circuitry for a single wound coil in a phase of the motor and the composition of the inverter circuits for the other wound coils is identical thereto.

The operation of the thusly constituted SRM converter circuit will now be described.

Depending on a switching mode of the upper switching transistor Q11 and the lower switch Q12, the SRM inverter circuit is operated in separate modes such as magnetizing, self-freewheeling, and demagnetizing.

Figure 4:
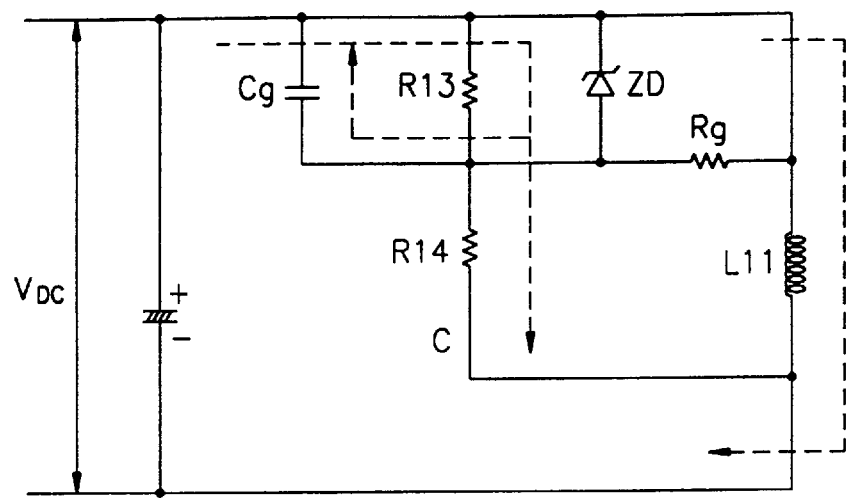
FIG. 4 is an equivalent circuit diagram during a magnetizing mode of the circuit of FIG. 3.

First, in the magnetizing mode a commutation signal is applied from the control circuit (not shown) to the gate of Q2 via R12 and the lower switching transistor Q12 is turned on and at this time, as shown in FIG. 4, the potential at point C becomes "0" volts and the voltage of the DC link is divided by the resistances R13, R14 so that the voltage Vgs through the resistances R13 and Rg is applied to the gate of the upper switching transistor Q11.

At this time, if voltage Vgs is larger than the threshold voltage Vth, the upper switching transistor Q11 is turned on, and its equivalent circuit is as shown in FIG. 4.

Then, the lower switching transistor Q12 and the upper switching transistor Q11 are turned on and the coil L11 becomes active, whereby forward directional torque is generated and the SRM is rotated.

Figure 5:
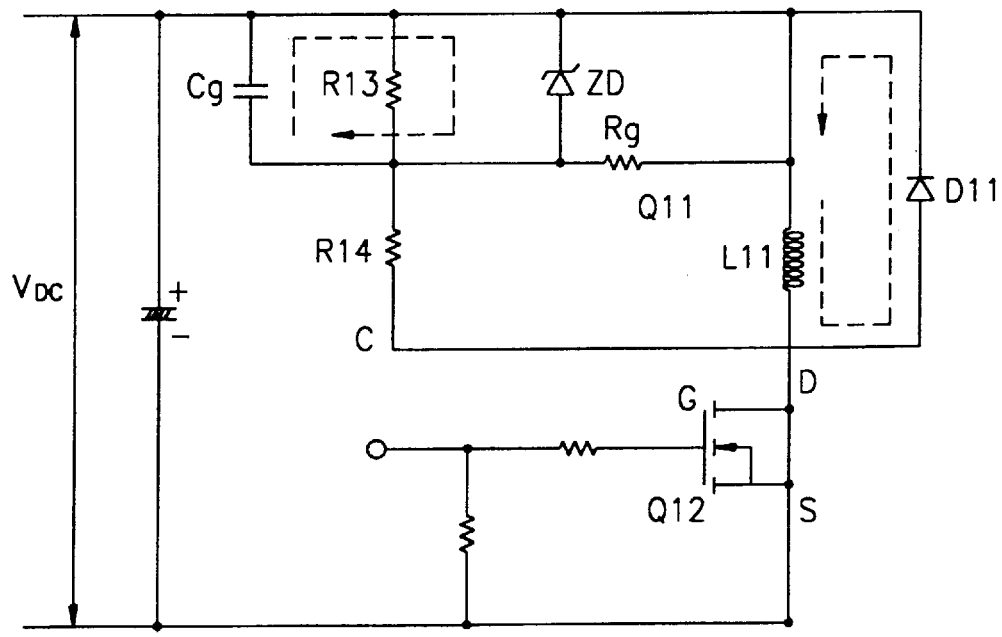
FIG. 5 is an equivalent circuit diagram during a self freewheeling mode of the circuit of FIG. 3.

Next, in the self-freewheeling mode, when a pulse width modulation (PWM) is carried out through controlled driving of the lower switching transistor Q12 to control power and the upper switching transistor Q11 is turned on by the PWM, as shown in FIG. 5, the potential at point C becomes higher than the positive potential at the DC link unit due to the turned-on voltage of the free-wheeling diode D11.

At this time, the voltage charged in the condenser Cg between the gate and source of Q11 is discharged through the resistance R13 connected in parallel therewith so that the voltage Vgs through the resistance R13 gradually becomes lower.

The zener diode (ZD) serves to quickly limit the gate voltage of the upper switching transistor Q11 not to exceed a certain level.

Therefore, when the PWM is performed, voltage Vgs should be maintained at more than the threshold voltage Vth of the upper switching transistor Q11 so as to continuously maintain a turned-on state of Q11, and this can be obtained by appropriately selecting the values of the condenser Cg and the resistance R13.

FIGS. 7B and 7C are voltage waveforms illustrating gate driving signals of the upper switching transistor Q11 and lower switching transistor Q12 in the absence of condenser Cg, wherein without condenser Cg the gate signal of Q11 is dropped lower than the threshold voltage Vth so that, as shown in FIG. 7A, the switching current of Q11 becomes extinct during the flow of the commutation signal.

As shown in FIG. 8B, when the condenser Cg is provided, the gate signal of Q11 does not drop lower than the threshold voltage Vth and as shown in FIG. 8A the switching current of Q11 does not cease during the flow of the commutation signal.

When the commutation and the PWM are completed and accordingly Q11 is turned off, voltage Vgs induced during the self-free wheeling through resistance R13 becomes gradually lowered and also Q11 is turned off.

Figure 6:
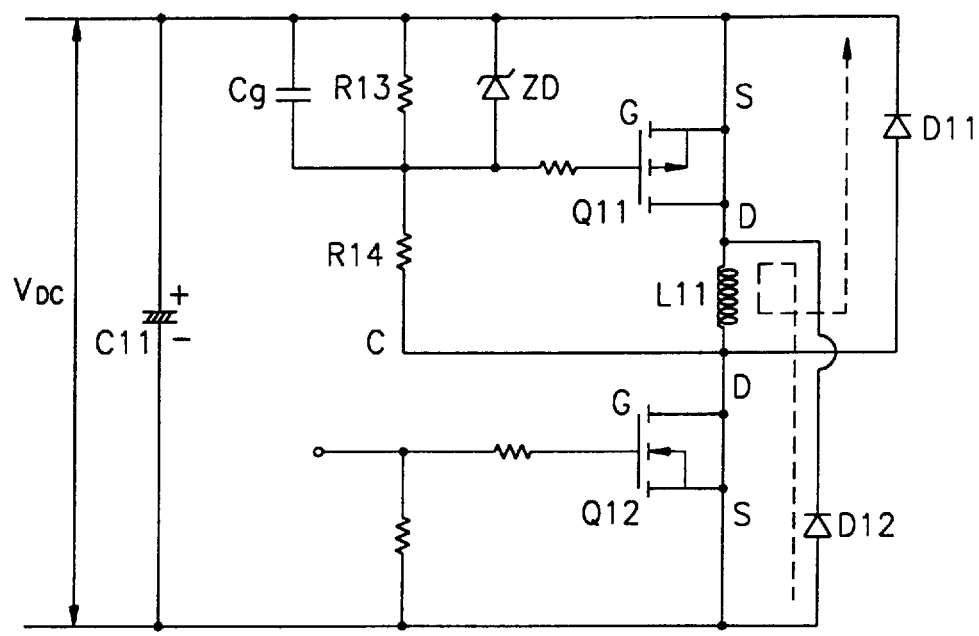
FIG. 6 is an equivalent circuit diagram during a demagnetizing mode of the circuit of FIG. 3.

As shown in FIG. 6, the current running in the coil L11 is free-wheeled through the free wheeling diodes D11, D12 toward the filter condensers.

Consequently, in the present invention the upper switching transistor Q11 only carries out commutation, whereas the lower switching transistor Q12 carries out both commutation and PWM, and by continuously repeating such operation the SRM is operated.

Also, the present invention is applicable to a four-phase SRM as well as to a three-phase SRM and because a driver circuit for a stepping motor is basically of an identical type to that for the SRM it is further applicable to a stepping motor.

As described above, the present invention decreases the size of a PCB and the production cost by replacing with a low cost passive component the isolating device and gate driver which are required in the conventional inverter circuit.

Further, the upper switching transistor is operated in accordance with the operation of the lower switching transistor and accordingly the upper switching transistor only carries out commutation, whereby the lower switching transistor is able to perform both the commutation and the PWM.

What is claimed is:

1. An inverter circuit for a switched reluctance motor (SRM), comprising:

a lower switching transistor connected to a corresponding lower negative pole of a filter condenser, the lower switching transistor being switched in accordance with a commutation control signal;

an upper switching transistor connected to a corresponding upper positive pole of the filter condenser and the upper switching transistor being switched in accordance with a switching operation of the lower switching transistor;

a voltage divider for dividing a voltage of a DC link applied to a gate of the upper switching transistor when the lower switching transistor is turned on;

a capacitor connected between a positive arm of the DC link and the voltage divider for controlling a gate voltage of the upper switching transistor in accordance with the voltage divided by the voltage divider; and an inductor in series between the upper and lower switching transistors and energized in accordance with a switching operation of the upper and lower switching transistors.

2. The circuit of claim 1, wherein the upper switching transistor is a P-channel MOSFET transistor and the lower switching transistor is an N-channel MOSFET transistor.

3. The Circuit of claim 1, further comprising a zener diode connected between a positive arm of the DC link and the gate of the upper switching transistor for maintaining the gate voltage of the upper switching transistor at a certain level.

4. The circuit of claim 1, wherein the upper switching transistor only carries out a commutation and the lower switching transistor performs a commutation as well as pulse width modulation.

5. The circuit of claim 1 in which the voltage divider comprises a plurality of resistors.

* * * * *